United States Patent
Takagi et al.

(10) Patent No.: US 11,192,540 B2
(45) Date of Patent: Dec. 7, 2021

(54) CONTROL APPARATUS OF PLUG-IN HYBRID ELECTRIC VEHICLE

(71) Applicant: SUBARU CORPORATION, Tokyo (JP)

(72) Inventors: Hidehiro Takagi, Tokyo (JP); Noriyuki Kubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 225 days.

(21) Appl. No.: 15/729,415

(22) Filed: Oct. 10, 2017

(65) Prior Publication Data
US 2018/0111602 A1  Apr. 26, 2018

(30) Foreign Application Priority Data
Oct. 20, 2016 (JP) .............................. JP2016-205650

(51) Int. Cl.
*B60W 10/00* (2006.01)
*B60W 20/18* (2016.01)
(Continued)

(52) U.S. Cl.
CPC ............ *B60W 20/18* (2016.01); *B60W 10/06* (2013.01); *B60W 10/08* (2013.01); *B60W 10/26* (2013.01);
(Continued)

(58) Field of Classification Search
CPC ...... B60W 20/18; B60W 10/06; B60W 10/08; B60W 2560/04; B60W 2510/244;
(Continued)

(56) References Cited

U.S. PATENT DOCUMENTS 5,786,640 A * 7/1998 Sakai .................. B60K 6/46
290/17
6,048,289 A * 4/2000 Hattori ................ B60K 6/48
477/15
(Continued)

FOREIGN PATENT DOCUMENTS

JP  2011-251680 A  12/2011
JP  2012-166777 A  9/2012
(Continued)

OTHER PUBLICATIONS

Japanese Office Action, dated Jul. 31, 2018, in Japanese Application No. 2016-205650 and English Translation thereof.

*Primary Examiner* — Ian Jen
(74) *Attorney, Agent, or Firm* — McGinn IP Law Group, PLLC

(57) ABSTRACT

A control apparatus of a plug-in hybrid electric vehicle that is provided with a fuel tank, an engine, a battery, and an electric motor. The battery is chargeable by an external power source. The control apparatus includes a fuel deterioration determiner and a regeneration amount limiter. The fuel deterioration determiner determines whether a fuel stored in the fuel tank is deteriorated. The regeneration amount limiter reduces, when the fuel is determined by the fuel deterioration determiner as being deteriorated, a regeneration amount to be less than the regeneration amount of a case where the fuel is determined by the fuel deterioration determiner as not being deteriorated. The regeneration amount is an amount of regeneration of electric power generated by the electric motor upon deceleration of the plug-in hybrid electric vehicle.

8 Claims, 2 Drawing Sheets

(51) Int. Cl.
*B60W 10/26* (2006.01)
*B60W 10/08* (2006.01)
*B60W 10/06* (2006.01)

(52) U.S. Cl.
CPC . *B60W 2510/244* (2013.01); *B60W 2530/211* (2020.02); *Y02T 10/40* (2013.01); *Y02T 10/62* (2013.01); *Y02T 10/7072* (2013.01)

(58) Field of Classification Search
CPC .... B60W 10/26; Y02T 10/6286; Y02T 10/52; Y02T 10/7077
See application file for complete search history.

(56) References Cited

U.S. PATENT DOCUMENTS

| | | | |
|---|---|---|---|
| 6,359,419 B1* | 3/2002 | Verbrugge | B60K 6/44 320/132 |
| 6,639,385 B2* | 10/2003 | Verbrugge | G01R 31/3835 320/132 |
| 7,768,233 B2* | 8/2010 | Lin | H01M 10/443 320/132 |
| 2003/0076109 A1* | 4/2003 | Verbrugge | G01R 31/392 324/427 |
| 2004/0162683 A1* | 8/2004 | Verbrugge | G01R 31/3828 702/64 |
| 2008/0091314 A1* | 4/2008 | Hayashi | B60K 6/48 701/22 |
| 2009/0091299 A1* | 4/2009 | Lin | H01M 10/441 320/137 |
| 2009/0223726 A1* | 9/2009 | Jeon, II | B60L 3/0046 180/65.25 |
| 2009/0325004 A1* | 12/2009 | Choi | H01M 8/04626 429/431 |
| 2010/0009219 A1* | 1/2010 | Kwon | B60L 58/34 429/432 |
| 2010/0089672 A1* | 4/2010 | Lee | B60L 7/16 180/65.275 |
| 2011/0046835 A1* | 2/2011 | Taguchi | B60W 10/06 701/22 |
| 2012/0139330 A1* | 6/2012 | Morishita | B60T 1/10 303/3 |
| 2013/0008533 A1* | 1/2013 | Kato | H01M 10/48 137/551 |
| 2013/0096748 A1* | 4/2013 | Hussain | B60W 10/06 701/22 |
| 2013/0151056 A1 | 6/2013 | Nakano | |
| 2015/0286199 A1 | 10/2015 | Fushiki | |
| 2015/0314765 A1* | 11/2015 | Maruo | B60T 8/4081 303/10 |
| 2015/0369147 A1* | 12/2015 | Itoh | B60W 20/18 701/22 |
| 2017/0001623 A1* | 1/2017 | Kim | B60W 10/08 |
| 2017/0021820 A1* | 1/2017 | Ogawa | B60W 10/06 |

FOREIGN PATENT DOCUMENTS

| | | | |
|---|---|---|---|
| JP | 2013-006596 A | 1/2013 | |
| JP | 2014-073704 A | 4/2014 | |
| JP | WO2014/053894 | * 10/2014 | ........ H01M 8/04567 |
| JP | 2015-209158 A | 11/2015 | |
| JP | 2016-007912 A | 1/2016 | |

* cited by examiner

1

CONTROL APPARATUS OF PLUG-IN HYBRID ELECTRIC VEHICLE

CROSS-REFERENCE TO RELATED APPLICATIONS

The present application claims priority from Japanese Patent Application No. 2016-205650 filed on Oct. 20, 2016, the entire contents of which are hereby incorporated by reference.

BACKGROUND

The technology relates to a control apparatus of a plug-in hybrid electric vehicle.

In recent years, a plug-in hybrid electric vehicle (PHEV) has been put into practical use. The plug-in hybrid electric vehicle includes an engine and an electric motor as drive sources, and allows for charging, from the outside, of a battery that supplies electric power to the electric motor. The plug-in hybrid electric vehicle involves high frequency of EV traveling in which the vehicle travels only by the electric motor as compared with a hybrid electric vehicle that allows for no external charging, and an amount of consumption of a fuel by the engine tends to become small accordingly. In particular, the frequency of the EV traveling increases and thus frequency of driving of the engine tends to become extremely small for a driver who often travels for a short time. In this case, the fuel is hardly consumed, which may possibly cause the fuel to be stored in a fuel tank for a long period of time, such as a year or more.

The deterioration of the fuel, such as oxidation, progresses when the fuel is unused for a long period of time. A desired engine performance may not possibly be obtained when the engine is driven with use of the fuel in which the deterioration has progressed excessively. It is accordingly desirable that the fuel be consumed before the deterioration of the fuel progresses excessively.

For example, Japanese Unexamined Patent Application Publication (JP-A) No. 2012-166777 discloses a control apparatus of a hybrid electric vehicle that estimates a time period required from the present to refueling and a time period required from the present to the fuel deterioration. The control apparatus switches to a fuel consumption promoting mode when the refueling timing comes after the timing at which the fuel deterioration occurs. Upon the fuel consumption promoting mode, the control apparatus lowers an upper limit of charging performed on a battery by means of external charging, and drives an engine irrespective of a state of charge (SOC) of the battery to thereby charge the battery on the basis of electric power generation by means of the engine driving.

SUMMARY

In order to consume a fuel, a technique disclosed in JP-A No. 2012-166777 forcibly drives an engine by a control that is different from a control performed normally. Such forced driving of the engine is performed regardless of intention of a driver of a vehicle, which may possibly go against the driver's expectation.

It is desirable to provide a control apparatus of a plug-in hybrid electric vehicle that makes it possible to promote consumption of a fuel before the fuel deteriorates, without forcibly driving an engine.

An aspect of the technology provides a control apparatus of a plug-in hybrid electric vehicle. The plug-in hybrid electric vehicle is provided with a fuel tank configured to store a fuel, an engine configured to receive the fuel supplied from the fuel tank, a battery chargeable by an external power source, and an electric motor configured to receive electric power from the battery. The control apparatus includes: a fuel deterioration determiner configured to determine whether the fuel stored in the fuel tank is deteriorated; and a regeneration amount limiter configured to, when the fuel is determined by the fuel deterioration determiner as being deteriorated, reduce a regeneration amount to be less than the regeneration amount of a case where the fuel is determined by the fuel deterioration determiner as not being deteriorated. The regeneration amount is an amount of regeneration of electric power generated by the electric motor upon deceleration of the plug-in hybrid electric vehicle.

DETAILED DESCRIPTION

In the following, a description is given in detail of one implementation of the technology with reference to the accompanying drawings.

Figure 1:
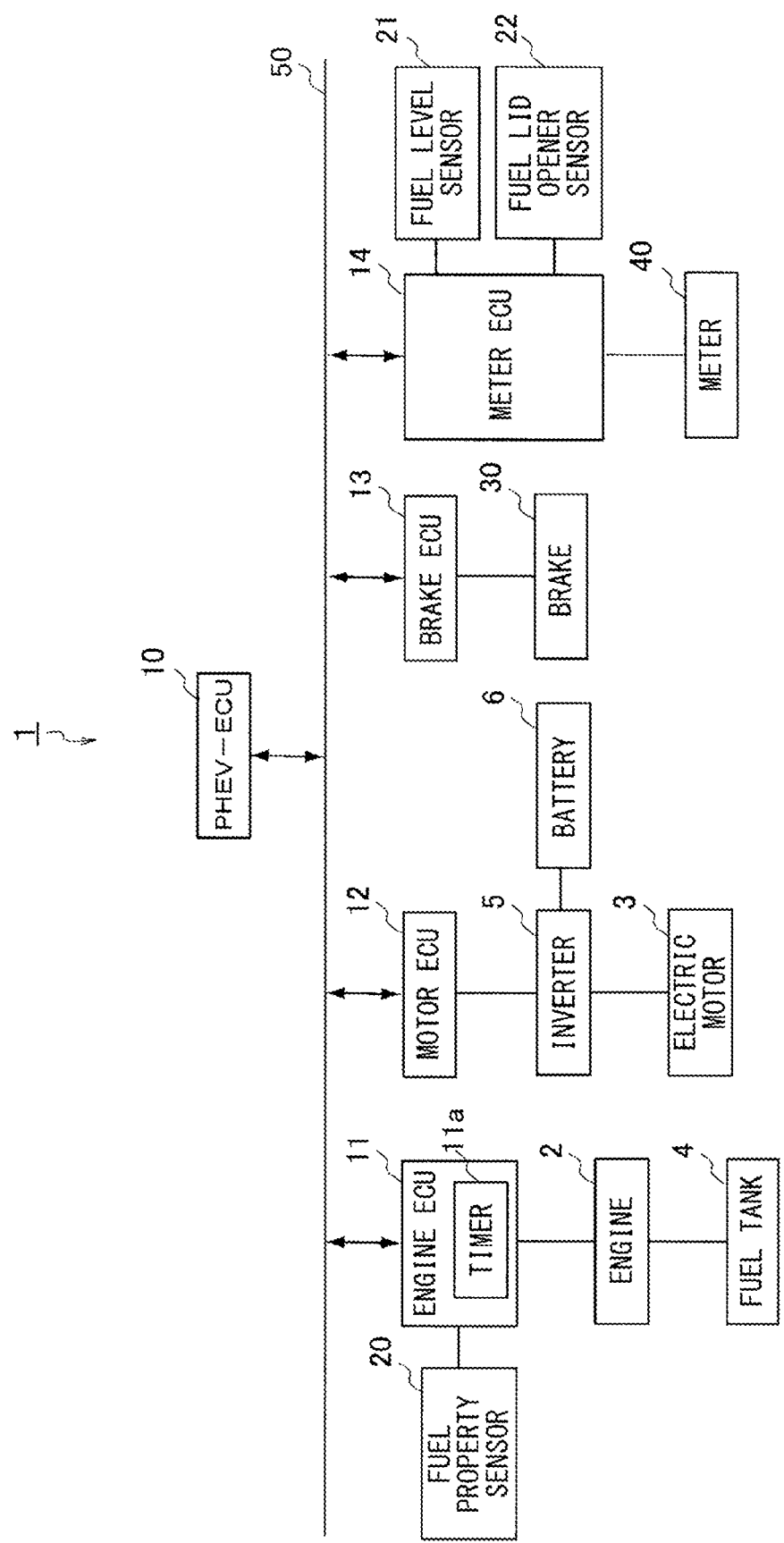
FIG. 1 is a block diagram illustrating a control apparatus of a plug-in hybrid electric vehicle according to one implementation.

Referring to FIG. 1, a description is given of a control apparatus 1 of a plug-in hybrid electric vehicle according to one implementation. FIG. 1 is a block diagram illustrating the control apparatus 1 of the plug-in hybrid electric vehicle according to one implementation. Before describing the control apparatus 1, a description is given of an example of the plug-in hybrid electric vehicle mounted with the control apparatus 1. The plug-in hybrid electric vehicle includes an engine 2 and an electric motor 3 as drive sources.

The engine 2 may have any form. Non-limiting examples of the engine 2 may include a horizontal-opposed four cylinder gasoline engine. The engine 2 may receive a supply of a fuel from a fuel tank 4. The fuel may be, for example but not limited to, gasoline. The engine 2 may be controlled by a later-described engine ECU (Electronic Control Unit) 11.

The electric motor 3 may serve as a motor. Non-limiting examples of the electric motor 3 may include a three-phase alternating-current motor. The electric motor 3 may also be a motor generator that serves as a generator. The electric motor 3 generates electric power upon deceleration of a vehicle by utilizing rotation of a wheel. The electric motor 3 may be controlled by an inverter 5.

The inverter 5 may convert direct-current electric power of a battery 6 into alternating-current electric power, and supply the thus-converted alternating-current electric power to the electric motor 3. The inverter 5 may also convert the alternating-current electric power generated by the electric motor 3 into the direct-current electric power, and supply the electric energy thus obtained by the conversion to the battery 6 to charge the battery 6. The inverter 5 may be controlled by a later-described motor ECU 12.

The battery 6 supplies the electric power to the electric motor 3. The battery 6 is charged by the electric power derived from the regeneration performed by the electric motor 3. The battery 6 is also chargeable by electric power supplied from an external power source. The battery 6 may be high in voltage than an unillustrated auxiliary battery, and may have, for example but not limited to, hundreds of volts. The battery 6 may be a lithium-ion battery without limitation.

A description is given now of the control apparatus 1. When the fuel stored in the fuel tank 4 is determined by the later-described engine ECU 11 as being deteriorated, the control apparatus 1 performs a control that reduces a regeneration amount of the electric power, generated by the electric motor 3 upon the deceleration of the vehicle, to be less than the regeneration amount of a case where the fuel is determined by the engine ECU 11 as not being deteriorated. The control apparatus 1 may perform the control before the fuel stored in the fuel tank 4 is deteriorated excessively. In one implementation, the control apparatus 1 may perform the control that causes the regeneration amount to be 0 (zero) when the fuel is determined as being deteriorated, before the fuel is deteriorated excessively. As used herein, the term "regeneration amount" may refer to an amount of electric power to be collected as electric energy. To perform the control, the control apparatus 1 according to one implementation may include a PHEV (Plug-in Hybrid Electric Vehicle)-ECU 10, the engine ECU 11, the motor ECU 12, a brake ECU 13, and a meter ECU 14, which may be able to communicate with each other through any network such as, but not limited to, a CAN (Controller Area Network) 50.

The PHEV-ECU 10 may be a control unit that performs an overall control of the plug-in hybrid electric vehicle. The PHEV-ECU 10 may include devices such as a microprocessor that performs calculation, a ROM (Read-Only Memory) storing information such as a program that causes the microprocessor to execute various processes, a RAM (Random Access Memory) that stores various pieces of data such as a result of the calculation, a backup RAM that holds stored contents thereof, and an input-output I/F.

The PHEV-ECU 10 may set a traveling mode and determine a target acceleration rate. The PHEV-ECU 10 may set the traveling mode on the basis of a factor such as, but not limited to, a driving state of the vehicle and a state of charge (SOC) of the battery 6. The traveling mode may include, for example but not limited to, an engine traveling mode that involves a drive performed solely by the engine 2, a motor traveling mode that involves the drive performed solely by the electric motor 3, and a hybrid traveling mode that involves the drive performed by the engine 2 and the electric motor 3. Non-limiting examples of the driving state of the vehicle may include a vehicle speed and requested drive force. The PHEV-ECU 10 may determine the target acceleration rate on the basis of a factor such as, but not limited to, a position of an accelerator pedal. When the engine traveling mode is set, the PHEV-ECU 10 may determine target engine torque that is necessary for achieving the target acceleration rate, and transmit information on the determined target engine torque to the engine ECU 11. When the motor traveling mode is set, the PHEV-ECU 10 may determine target motor torque that is necessary for achieving the target acceleration rate, and transmit information on the determined target motor torque to the motor ECU 12. When the hybrid traveling mode is set, the PHEV-ECU 10 may set a rate of distribution of drive force between the engine 2 and the electric motor 3 on the basis of the factor such as the driving state of the vehicle and the SOC of the battery 6. Further, the PHEV-ECU 10 may determine, on the basis of the set rate of distribution, the target engine torque and the target motor torque that are necessary for achieving the target acceleration rate, and transmit the information on the determined target engine torque to the engine ECU 11 and the information on the determined target motor torque to the motor ECU 12.

In one implementation, the PHEV-ECU 10 may serve as an "overall controller" of the control apparatus 1. The PHEV-ECU 10 may receive a result of determination on the deterioration of the fuel, i.e., a "fuel deterioration determination result", from the engine ECU 11. When the fuel deterioration determination result indicates that the fuel is deteriorated, the PHEV-ECU 10 may transmit, to the brake ECU 13, a request to limit the regeneration amount, i.e., a "regeneration amount limiting request". In one implementation, the regeneration amount limiting request may be directed to the reduction of the regeneration amount to 0 (zero). Further, when the fuel deterioration determination result indicates that the fuel is deteriorated, the PHEV-ECU 10 may transmit, to the meter ECU 14, a request to display alert regarding a limitation on the regeneration amount, i.e., a "limitation alert display request", and a request to display alert regarding the deterioration of the fuel, i.e., a "fuel deterioration alert display request". The PHEV-ECU 10 may stop the transmission of the regeneration amount limiting request, the limitation alert display request, and the fuel deterioration alert display request, when the fuel deterioration determination result is changed to indicate, from the indication that the fuel is deteriorated, that the fuel is not deteriorated.

The engine ECU 11 may be a control unit that controls the engine 2. The engine ECU 11 may include devices such as a microprocessor, a ROM, a RAM, a backup RAM, and an input-output I/F, as with the PHEV-ECU 10. For example, when the information on the target engine torque transmitted from the PHEV-ECU 10 is received, the engine ECU 11 may control, on the basis of the target engine torque, a factor such as, but not limited to, a fuel injection amount and an ignition timing of the engine 2.

In one implementation, the engine ECU 11 may serve as a "fuel deterioration determiner" of the control apparatus 1. Specifically, the engine ECU 11 may acquire information that is necessary for determining the deterioration of the fuel, i.e., fuel deterioration determination information, and determine, on the basis of the acquired information, whether the fuel stored in the fuel tank 4 is deteriorated. For example, the determination on the fuel deterioration performed by the engine ECU 11 may be directed to a determination as to whether the fuel is in a mildly-deteriorated state that is before the fuel is in an excessively-deteriorated state in which the engine performance decreases due to the deterioration of the fuel. Non-limiting examples of the engine performance may include starting performance, engine efficiency, and emission performance. Further, the engine ECU 11 may transmit a result of the determination on the fuel deterioration to the PHEV-ECU 10.

The determination as to whether the fuel is deteriorated may be performed on the basis of whether the deterioration of the fuel progresses to a predetermined level or beyond. Non-limiting examples of an index value that indicates the level of the fuel deterioration may include fuel consumption efficiency, fuel property, a period of time, such as the number of days, during which the fuel is being stored, and a period of time during which a fuel lid opener is not operated. The fuel lid opener may be a locking mechanism of a lid of the fuel tank 4.

One example method of determining the fuel deterioration may involve acquiring a theoretical value of engine torque and an actual value of the engine torque, followed by determination on the fuel consumption efficiency of the engine 2 using the theoretical value and the actual value to thereby determine whether the fuel consumption efficiency is equal to or less than predetermined efficiency. The theoretical value of the engine torque may be, for example but not limited to, a value of engine torque estimated by a factor such as an amount of intake air. The actual value of the engine torque may be, for example but not limited to, a value of the engine torque detected by a sensor. Another example method may involve determining whether the fuel property detected by a fuel property sensor 20 is equal to or less than a reference value. Yet another example method may involve acquiring information on a fuel level of the fuel tank 4 to determine whether the fuel level is not increased for a predetermined period of time or over. Still another example method may involve acquiring information on the operation of the fuel lid opener to determine whether the fuel lid opener is not opened for a predetermined period of time or over from a previous closing of the fuel lid opener. The fuel deterioration may be determined on the basis of any of the foregoing example determination methods, or on the basis of a combination of two or more of the foregoing example determination methods, to accurately determine the fuel deterioration.

For example, an alternative example method of more accurately determining the fuel deterioration may use a time-series data of the fuel level. The example alternative method may involve monitoring the fuel level of the fuel stored in the fuel tank 4 through time, calculating, when the fuel level increases, an amount of addition of the fuel and a rate between the amount of addition and the fuel level of the fuel remaining in the fuel tank 4, and determining whether the fuel is deteriorated on the basis of the calculated rate and a period of time elapsed from the addition of the fuel.

To acquire the information on the fuel level, the engine ECU 11 may receive information on the fuel level detected by a fuel level sensor 21 from the meter ECU 14 through the CAN 50. To acquire the information on the operation of the fuel lid opener, the engine ECU 11 may receive information on the operation detected by a fuel lid opener sensor 22, i.e., open-close information, from the meter ECU 14 through the CAN 50. The engine ECU 11 may use a timer 11a to measure a period of time, such as the number of days, during which the fuel level is not increased, or the period of time during which the fuel lid opener is not operated.

The motor ECU 12 may be a control unit that controls the inverter 5 to thereby control the electric motor 3. The motor ECU 12 may include devices such as a microprocessor, a ROM, a RAM, a backup RAM, and an input-output I/F, as with the PHEV-ECU 10. For example, when the information on the target motor torque transmitted from the PHEV-ECU 10 is received, the motor ECU 12 may control the inverter 5 on the basis of the target motor torque. The motor ECU 12 may also control the inverter 5 on the basis of a target regeneration amount, i.e., target regeneration brake torque, when the target regeneration amount transmitted from the brake ECU 13 is received.

In one implementation, the motor ECU 12 may serve as a part of a "regeneration amount limiter" of the control apparatus 1. When the target regeneration amount directed to the limitation on the regeneration amount is received from the brake ECU 13, the motor ECU 12 performs the control, on the inverter 5, that causes the regeneration amount derived from the electric motor 3 to be reduced. In one implementation, when the "target regeneration amount=0" is received from the brake ECU 13, the motor ECU 12 may perform the control, on the inverter 5, that causes the regeneration amount to be 0 (zero), i.e., that refrains from charging the battery 6 by means of the regeneration.

The brake ECU 13 may be a control unit that controls a brake 30 and the regeneration brake. The brake 30 may be, for example but not limited to, a disc brake operated by a hydraulic pressure. The brake ECU 13 may include devices such as a microprocessor, a ROM, a RAM, a backup RAM, and an input-output I/F, as with the PHEV-ECU 10. The brake ECU 13 may also include a hydraulic mechanism that supplies the hydraulic pressure to the brake 30.

For example, the brake ECU 13 may determine a target deceleration rate on the basis of a factor such as, but not limited to, an amount of pressing down on a brake pedal, and may set a rate of distribution between braking performed by the brake 30 and the regeneration brake derived from the electric motor 3, on the basis of a factor such as, but not limited to, the driving state of the vehicle and the SOC of the battery 6. Further, the brake ECU 13 may determine, on the basis of the set rate of distribution, target main brake torque that is to be obtained by the brake 30 and necessary for achieving the target deceleration rate, and the target regeneration brake torque that is to be obtained by the regeneration brake and necessary for achieving the target deceleration rate. The brake ECU 13 may thereafter supply, to the brake 30, the hydraulic pressure that generates the target main brake torque and transmit, to the motor ECU 12, the target regeneration brake torque, i.e., the target regeneration amount.

In one implementation, the brake ECU 13 may serve as a part of the "regeneration amount limiter" of the control apparatus 1. When the regeneration amount limiting request transmitted from the PHEV-ECU 10 is received, the brake ECU 13 so sets the target regeneration brake torque as to be reduced, and transmits the set target regeneration brake torque, i.e., the target regeneration amount, to the motor ECU 12. In one implementation, when the regeneration amount limiting request transmitted from the PHEV-ECU 10 is received, the brake ECU 13 may set 0 (zero) for the target regeneration brake torque, and transmit the "target regeneration brake torque (the target regeneration amount)=0" to the motor ECU 12. The brake ECU 13 may also set the target main brake torque necessary for achieving the target deceleration rate, and supply, to the brake 30, the hydraulic pressure that generates the target main brake torque. In one implementation, the PHEV-ECU 10, the motor ECU 12, and the brake ECU 13 may serve as the "regeneration amount limiter".

The meter ECU 14 may be a control unit that controls a meter 40. The meter 40 may be, for example but not limited to, a combination meter. The meter 40 may encompass a display in one implementation where the display is provided that is disposed on a location such as an upper part of a dashboard and displays various pieces of information on the vehicle. The meter ECU 14 may include devices such as a microprocessor, a ROM, a RAM, a backup RAM, and an input-output I/F, as with the PHEV-ECU 10. The meter ECU 14 may control displaying, to be performed on the meter 40, of the various pieces of information on the vehicle. Non-limiting examples of the information may include the vehicle speed, an engine speed, a mileage, the fuel level, a coolant temperature, various warning lights, and an operating status of a hybrid system.

In one implementation, the meter ECU 14 may serve as a part of an "information provider" of the control apparatus 1. When the limitation alert display request transmitted from the PHEV-ECU 10 is received, the meter ECU 14 may cause a warning light to be lighted that is provided in the meter 40 and indicates that the regeneration amount is limited. In one implementation, in particular, the warning light may indicate that the regeneration is halted. Alternatively, the meter ECU 14 may display, in a predetermined display region in the meter 40, a message notifying that the regeneration amount is limited. In one implementation, in particular, the message may notify that the regeneration is halted. Further, when the fuel deterioration alert display request transmitted from the PHEV-ECU 10 is received, the meter ECU 14 may cause a warning light to be lighted that is provided in the meter 40 and indicates that the fuel is deteriorated. Alternatively, the meter ECU 14 may display, in a predetermined display region in the meter 40, a message notifying that the fuel is deteriorated. In one implementation, the PHEV-ECU 10, the meter ECU 14, and the meter 40 may serve as a "limitation information provider" and a "fuel deterioration information provider".

Figure 2:
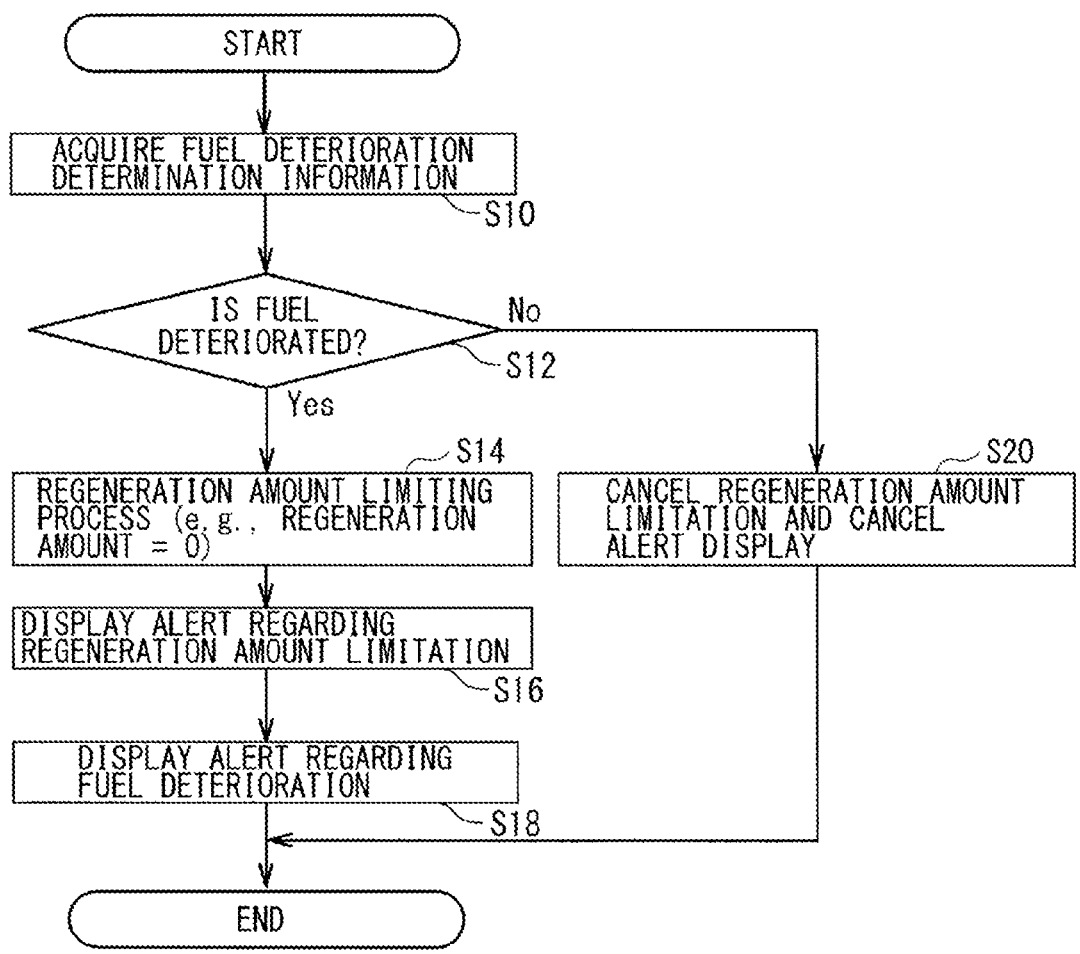
FIG. 2 is a flowchart illustrating an example of a flow of processes performed in the control apparatus of the plug-in hybrid electric vehicle according to one implementation.

A description is given next, with reference to FIG. 1 and a flowchart illustrated in FIG. 2, of an example of a flow of processes to be performed by the control apparatus 1. FIG. 2 is a flowchart illustrating an example of the flow of the processes performed in the control apparatus 1 of the plug-in hybrid electric vehicle according to one implementation. The processes to be described in the following may be performed repeatedly for each predetermined timing.

The engine ECU 11 may acquire the fuel deterioration determination information (S10). The engine ECU 11 may make a determination, with use of the acquired information, as to whether the fuel stored in the fuel tank 4 is deteriorated (S12). The engine ECU 11 may thereafter transmit a result of the determination to the PHEV-ECU 10.

When the determination is made in S12 that the fuel is deteriorated (S12: Yes), the PHEV-ECU 10 may transmit the regeneration amount limiting request to the brake ECU 13 (S14). When the regeneration amount limiting request is received, the brake ECU 13 may determine the target deceleration rate upon the deceleration of the vehicle, and perform a control that allows the target deceleration rate to be achieved solely by the brake 30, and further transmit the target regeneration amount, i.e., the target regeneration brake torque, to the motor ECU 12 (S14). In one implementation, the brake ECU 13 may transmit the "target regeneration amount (the target regeneration brake torque)=0" to the motor ECU 12. When the target regeneration amount is received, the motor ECU 12 may perform, on the inverter 5, the control that reduces the regeneration amount derived from the electric motor 3 (S14). In one implementation, when the "target regeneration amount=0" is received, the motor ECU 12 may perform, on the inverter 5, the control that causes the regeneration amount derived from the electric motor 3 to be 0 (zero). Accordingly, this implementation allows the battery 6 to be not charged by the regeneration even upon the deceleration of the vehicle.

The PHEV-ECU 10 may transmit the limitation alert display request to the meter ECU 14 (S16). When the limitation alert display request is received, the meter ECU 14 may cause the meter 40 to display the alert regarding the limitation on the regeneration amount (S16). Performing such alert makes it possible to notify a user of the vehicle, such as a driver, that the charging of the battery 6 is not performed by the regeneration upon the deceleration of the vehicle, for example. Performing such alert also makes it possible to prevent the user of the vehicle from having a feeling of strangeness resulting from a situation where performing of a regeneration mode is not displayed at a status display of the hybrid system on the meter 40 despite the deceleration of the vehicle.

The PHEV-ECU 10 may further transmit the fuel deterioration alert display request to the meter ECU 14 (S18). When the fuel deterioration alert display request is received, the meter ECU 14 may cause the meter 40 to display the alert regarding the deterioration of the fuel (S18). Performing such alert, for example, prompts the user of the vehicle not to charge the battery 6 by means of the external power source. This may complete the processing to be performed this time.

In contrast, when the determination is made in S12 that the fuel is not deteriorated (S12: No), the processes performed in S14, S16, and S18 may not be performed. In this case, the PHEV-ECU 10 may stop the transmission of the regeneration amount limiting request, the limitation alert display request, and the fuel deterioration alert display request (S20), when the determination is switched from the previous determination performed in step S12 that the fuel is deteriorated to a determination that the fuel is not deteriorated, i.e., when the fuel is changed. This removes the limitation on the regeneration amount, and thus the brake ECU 13 may perform, upon the deceleration of the vehicle, a normal brake control that uses the brake 30 and the regeneration brake (S20). Further, the motor ECU 12 may perform a control that is performed on the inverter 5 upon the regeneration operation of the electric motor 3 (S20). This charges the battery 6 by means of the regeneration upon the deceleration of the vehicle. The displaying of the alerts are also cancelled and thus the meter ECU 14 may stop the displaying of the alert regarding the limitation on the regeneration amount and the displaying of the alert regarding the deterioration of the fuel that are performed on the meter 40 (S20). This may complete the processing to be performed this time.

Note that the charging of the battery 6 by means of the regeneration is reduced, or is not performed in one implementation, in a case where the fuel is determined as being deteriorated. This prevents the SOC of the battery 6 from being increased and promotes a decrease in the SOC as compared with a case where the battery 6 is charged by means of the regeneration, i.e., a case where the fuel is determined as not being deteriorated. Thus, in accordance with the SOC of the battery 6, the frequency in which a mode other than the motor traveling mode, such as the engine traveling mode and the hybrid traveling mode, is set increases and the rate of distribution of the drive force between the engine 2 and the electric motor 3 increases in a case where the hybrid traveling mode is set, as compared with a case where the fuel is determined as not being deteriorated upon the normal control performed by the PHEV-ECU 10. Hence, the frequency in which the engine 2 is driven increases and an amount of consumption of the fuel by the engine 2 increases accordingly as compared with the case where the fuel is determined as not being deteriorated, consequently allowing the fuel level of the fuel stored in the fuel tank 4 to be decreased promptly.

The control apparatus 1 according to one implementation thus reduces or limits the charging of the battery 6 performed by the regeneration when the fuel is deteriorated. In other words, the control apparatus 1 reduces or limits the charging by means of the regeneration before the fuel deteriorates excessively. By reducing or limiting the charging by means of the regeneration, the control apparatus 1 increases, through a control performed normally by the PHEV-ECU 10, the frequency in which the engine 2 is driven. Thus, it is possible to promote the consumption of the fuel without forcibly driving the engine 2 and thereby to allow the fuel to be consumed promptly and to allow for earlier changing of the fuel. It is also possible to suppress the decrease in the engine performance resulting from the excessive deterioration of the fuel by changing the fuel early.

In one implementation, the control apparatus 1 may cause the regeneration amount to be 0 (zero) as the limitation on the regeneration amount in a case where the fuel is deteriorated. Thus, the charging of the battery 6 by means of the regeneration derived from the electric motor 3 is not performed upon the deceleration of the vehicle. Hence, it is possible to promote the decrease in the SOC of the battery 6.

In one implementation, the control apparatus 1 may perform the displaying of the alert indicating that the regeneration amount is limited in a case where the regeneration amount is to be limited. Thus, it is possible to prevent the user of the vehicle from having a feeling of strangeness resulting from the non-performing of the regeneration despite the deceleration of the vehicle.

In one implementation, the control apparatus 1 may provide the information indicating that the fuel is deteriorated in a case where the fuel is determined as being deteriorated. Thus, it is possible to prompt the user of the vehicle to consume the fuel. Hence, it is possible to allow the user to, for example, refrain from charging the battery 6 by means of the external power source until the fuel is changed.

In one implementation, it is possible for the control apparatus 1 to determine whether the fuel is deteriorated, by utilizing the fuel consumption efficiency of the engine 2, the fuel property, the fuel level, and information on the operation of the fuel lid opener. In particular, it is possible to determine whether the fuel is deteriorated by utilizing an existing sensor in one implementation where a factor such as the fuel level is used to make the determination.

Although some implementations of the technology have been described in the foregoing, the technology is by no means limited to the implementations described above and may be modified in a wide variety of ways. For example, the control apparatus 1 is configured by the PHEV-ECU 10, the engine ECU 11, the motor ECU 12, the brake ECU 13, and the meter ECU 14 in one implementation described above. However, any other configuration may be employed for the control apparatus 1. For example, in one alternative implementation where a method of providing the information is to be varied from that described above, any other ECU corresponding to the method of providing the information may be added to the configuration of the control apparatus 1 in place of the meter ECU 14. For example, in one alternative implementation where the determination on the fuel deterioration is to be performed by the PHEV-ECU 10, the engine ECU 11 may not be added to the configuration of the control apparatus 1.

In one implementation described above, a configuration is employed in which the information is provided by, for example, lighting the warning lights of the meter 40. In one alternative implementation, the information may be provided by any other method such as, but not limited to, displaying of the information on a display used in a device such as a navigation system and outputting of the information by sound, voice, or both.

In one implementation described above, a configuration is employed in which the information on the limitation on the regeneration amount and the information on the fuel deterioration are both provided. In one alternative implementation, a configuration may be employed in which one of the information on the limitation on the regeneration amount and the information on the fuel deterioration is provided. In one alternative implementation, a configuration may be employed in which the provision of such information is not performed.

In one implementation described above, the regeneration amount may be set to 0 (zero) in order to limit the regeneration amount when the fuel is determined as being deteriorated. However, instead of causing the regeneration amount to be 0, a configuration may be employed in which the regeneration amount is limited by reducing the regeneration amount to be less than a normal regeneration amount derived from a situation where the fuel is determined as not being deteriorated, i.e., where the normal brake control is performed. In this case, an amount of reducing the regeneration amount, a rate of reducing the regeneration amount, or any other factor that causes the regeneration amount to be reduced, may be made variable. For example, a configuration may be employed in which a level of the fuel deterioration is estimated and in which the amount of reducing the regeneration amount, the rate of reducing the regeneration amount, or any other factor is increased with an increase in the level of the fuel deterioration.

One or more of the PHEV-ECU 10, the engine ECU 11, the motor ECU 12, the brake ECU 13, and the meter ECU 14 illustrated in FIG. 1 may be implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of one or more of the PHEV-ECU 10, the engine ECU 11, the motor ECU 12, the brake ECU 13, and the meter ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of one or more of the PHEV-ECU 10, the engine ECU 11, the motor ECU 12, the brake ECU 13, and the meter ECU 14 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus of a plug-in hybrid electric vehicle, the plug-in hybrid electric vehicle being provided with a fuel tank configured to store a fuel, an engine configured to receive the fuel supplied from the fuel tank, a battery chargeable by an external power source, an electric motor configured to receive electric power from the battery, and supplies the direct-current electric power to the battery to charge the battery, the control apparatus comprising:

a fuel deterioration determiner configured to determine whether the fuel stored in the fuel tank is deteriorated; and a regeneration amount limiter is configured to, whenever the fuel is determined by the fuel deterioration determiner as being deteriorated, reduce a regeneration amount of electric power to be less than the regeneration amount of a case where the fuel is determined by the fuel deterioration determiner as not being deteriorated when regeneration is performed by power generation by the electric motor during deceleration of the plug-in hybrid vehicle.

2. The control apparatus of the plug-in hybrid electric vehicle according to claim 1, wherein the regeneration amount limiter causes the regeneration amount to be substantially zero when the fuel is determined by the fuel deterioration determiner as being deteriorated.

3. The control apparatus of the plug-in hybrid electric vehicle according to claim 1, wherein the fuel deterioration determiner acquires, as a fuel consumption efficiency, an efficiency of consumption by the engine of the fuel, and determines whether the fuel consumption efficiency is equal to or less than a predetermined value.

4. The control apparatus of the plug-in hybrid electric vehicle according to claim 1, wherein the fuel deterioration determiner acquires information on a fuel level of the fuel stored in the fuel tank, and determines whether the fuel level is not increased for a predetermined period of time or over.

5. The control apparatus of the plug-in hybrid electric vehicle according to claim 1, wherein the fuel deterioration determiner acquires information on operation of a fuel lid opener that locks a lid of the fuel tank, and determines whether the fuel lid opener is not operated for a predetermined period of time or over.

6. The control apparatus of the plug-in hybrid electric vehicle according to claim 1, further comprising a limitation information provider configured to provide information that the regeneration amount is reduced.

7. The control apparatus of the plug-in hybrid electric vehicle according to claim 1, further comprising a fuel deterioration information provider configured to provide information that the fuel is deteriorated when the fuel is determined by the fuel deterioration determiner as being deteriorated.

8. The control apparatus of the plug-in hybrid electric vehicle according to claim 1, wherein the fuel deterioration determiner estimates a level of the fuel deterioration when the fuel is determined by the fuel deterioration determiner as being deteriorated, and wherein the regeneration amount limiter changes an amount of reducing the regeneration amount in accordance with the level of the fuel deterioration estimated by the fuel deterioration determiner.

* * * * *